United States Patent [19]

Takaki

[11] Patent Number: 4,829,379
[45] Date of Patent: May 9, 1989

[54] PICTURE IMAGE SIGNAL COMPENSATION DEVICE

[75] Inventor: Takanori Takaki, Kanagawa, Japan

[73] Assignee: Mitsubishi Denki Kabushiki Kaisha, Kamakura, Japan

[21] Appl. No.: 31,936

[22] Filed: Mar. 27, 1987

[30] Foreign Application Priority Data

Mar. 31, 1986 [JP] Japan .................................. 61-73384

[51] Int. Cl.$^4$ ........................ H04N 5/14; H04N 5/235
[52] U.S. Cl. ............................... 358/163; 358/213.27; 358/284
[58] Field of Search ................... 358/163, 213.27, 284

[56] References Cited

U.S. PATENT DOCUMENTS 4,523,229  6/1985  Kanmoto ............................. 358/163
4,633,314  12/1986  Karata et al. ....................... 358/163

Primary Examiner—James J. Groody
Assistant Examiner—Michael D. Parker
Attorney, Agent, or Firm—Gifford, Groh, Sheridan, Sprinkle & Dolgorukov

[57] ABSTRACT

A picture image signal compensation device for devices such as image scanner, facsimile and etc. comprises a whiteboard provided before manuscript in which an average value of white level signals of said whiteboard with unusually low values eliminated in obtaining the average value or an average value of white level signals of said whiteboard with an average value by the plural scannings is used as a standard datum for each of picture elements for picture image signal compensation.

10 Claims, 6 Drawing Sheets

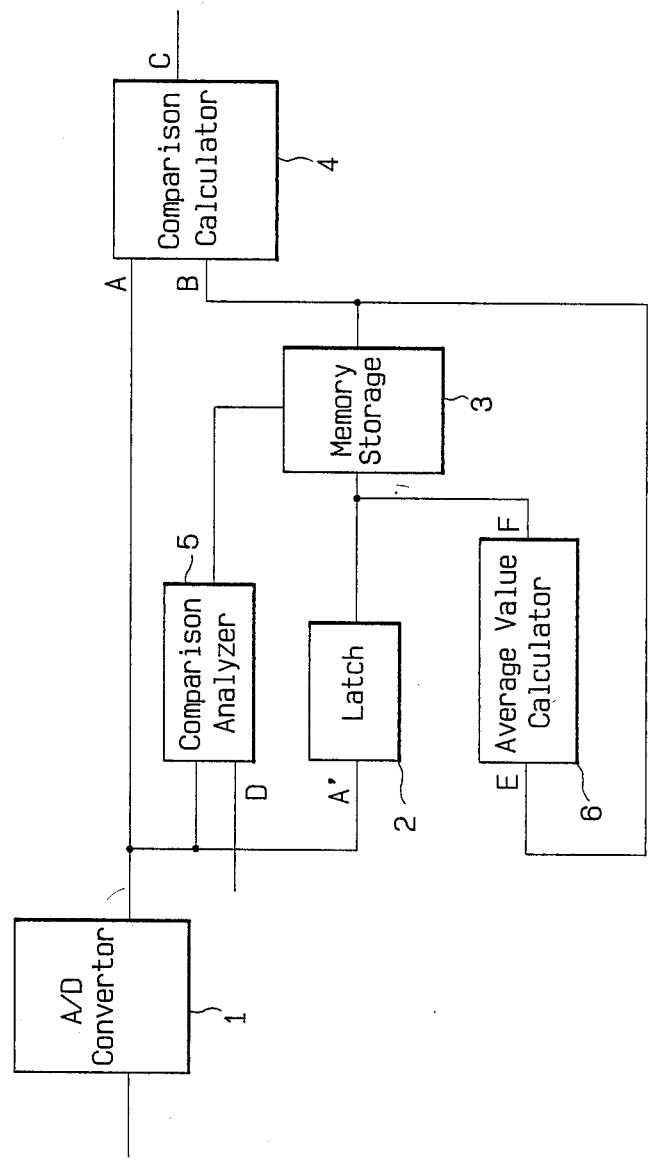

PICTURE IMAGE SIGNAL COMPENSATION DEVICE

BACKGROUND OF THE INVENTION (1) Field of the Invention

This invention relates to devices such as image scanning, facsimile and etc. and particularly to the picture image signal compensation device for eliminating variations among picture elements of said devices.

(2) Description of the Prior Art

FIG. 3 is a block diagram showing a circuit construction of a conventional picture image signal compensation device.

In the drawing, (1) indicates an A/D signal converter which converts analogous picture image signals to digital picture image signals, (2) a latch which holds data temporarily, (3) a memory storage for storing said held data, and (4) a comparison calculator to compensate for picture image data by comparison of manuscript image data with the data from whiteboard stored in the memory storage 3.

Next, compensating operation of the conventional picture image compensating device as shown in above FIG. 3 is explained. A standard picture image signal (A') at a level of whiteboard 10 converted by the A/D converter (1) is held at the latch 2 at the time of reference at the level of the whiteboard, stored at each location of tahe memory storage 3 corresponding to each of picture elements and on completion of reference of 1 line of the white level, storing the data into the memory storage finishes also.

Next, the original manuscript image signals converted by the A/D convertor are compared proportionally with the signal data B of the picture elements at the white level stored in the memory storage 3, and picture image compensation signals C having been compensated from the original manuscript image signals A are taken out from this comparison calculator 4.

Since said conventional picture image signal compensation device is constructed as stated above, there has been a problem that the whiteboard which functions as a white level standard must be kept free from even a little dust and scratches and for this reason is necessary to be cleaned periodically.

SUMMARY OF THE INVENTION

It is an object of this invention to solve such a problem and to provide a picture image signal compensation device which is capable of obtaining stable picture image signals from a whiteboard even with some dust and scratches and which erases the variations among picture elements. The picture image signal compensation device of this invention is provided with a wide whiteboard 10 placed before a manuscript 11 is made to refer plural times to the whiteboard 10 passing before a line image sensor 12 reads the manuscript 11, decide as a standard datum an average value of the white data among each of picture elements referred plural times eliminating the usually low values, and store the average value datum into the memory storage corresponding to each of picture elements.

Furthermore, a picture image signal eompensation device of an embodiment of another invention of this invention application is also provided with a wide whiteboard 10 placed before manuscript 11 and is made to refer plural times to the whiteboard passing before a line image sensor 12 reads the manuscript, decide as a standard datum the average value of the white data among each of picture elements referred plural times eliminating the unusually low values, and stores the average value datum into the memory storage corresponding to each of picture elements.

In this picture image signal compensation device of this invention, the standard datum of an average value of each of picture elements is processed to be equal to the average value obtained by referring plural times to the whiteboard eliminating the unusually low values from the white data in the plural lines of the whiteboard referred plural times without any influence of a little dust and scratches and in order to obtain good qualitied picture image signals, the average value of the whie data of each picture element obtained from the whiteboard eliminating the unusually low values is decided as a standard datum.

Furthermore, in the picture image signal compensation device of an embodiment of another invention of this invention application, the standard datum of an average value of each of picture elements is processed, also, to be equal to an average white datum obtained by referring plural times to the whiteboard eliminating the unusually low values from the white data from the plural lines of the whiteboard referred plural times without any influence of a little dust and scratches, and in order to obtain good quality picture image signals, the average value of the white data of each picture element obtained from the whiteboard is decided as a standard datum.

BRIEF DESCRIPTION OF THE ACCOMPANYING DRAWINGS

FIG. 1A is a block drawing showing a circuit construction of an embodiment of the picture image signal compensation device of this invention. FIG. 1 B is a schematic diagram of the block diagram of FIG. 1. FIG. 1 C is a diagrammatic view showing the method of operation of the apparatus shown in FIG. 1 B. FIG. 2 is a block drawing showing a circuit construction of an embodiment of the picture image signal compensation device of another invention of this invention application. FIG. 3 is a block drawing showing a circuit construction of a conventional picture image signal compensation device. FIG. 4 is a simplified plan view of the scanning apparatus used in the present invention. FIG. 5 is an elevational view of the apparatus shown in FIG. 4.

DETAILED DESCRIPTION OF PREFERRED EMBODIMENTS

Figure 1B:
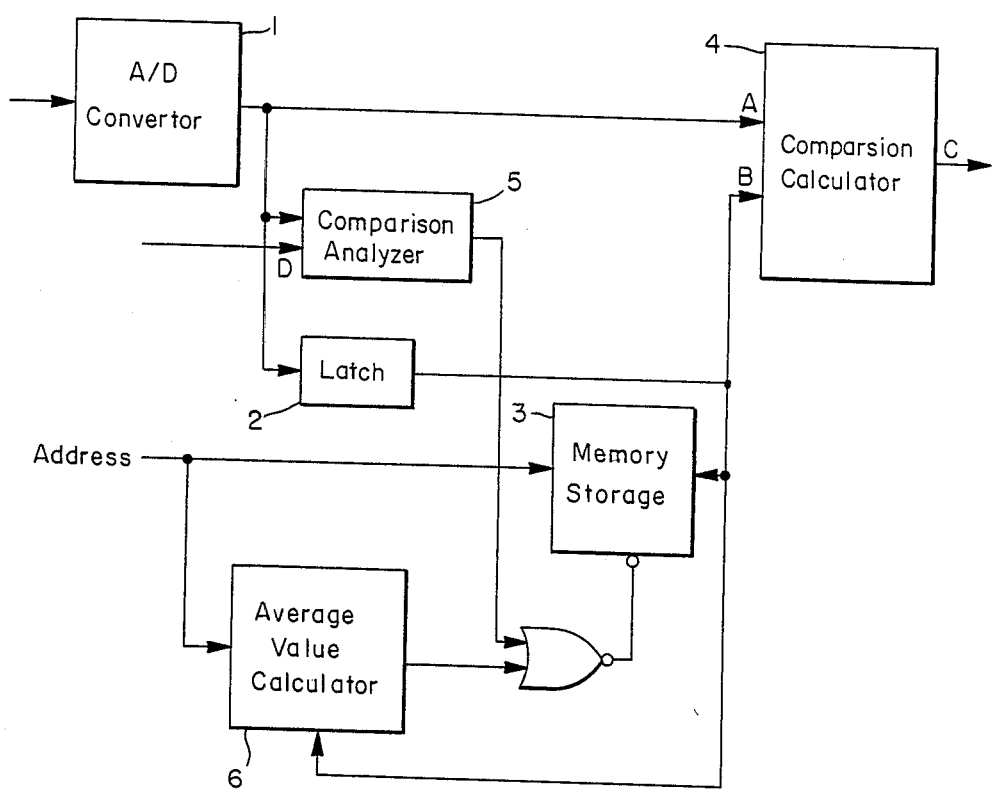
Figure 1C:
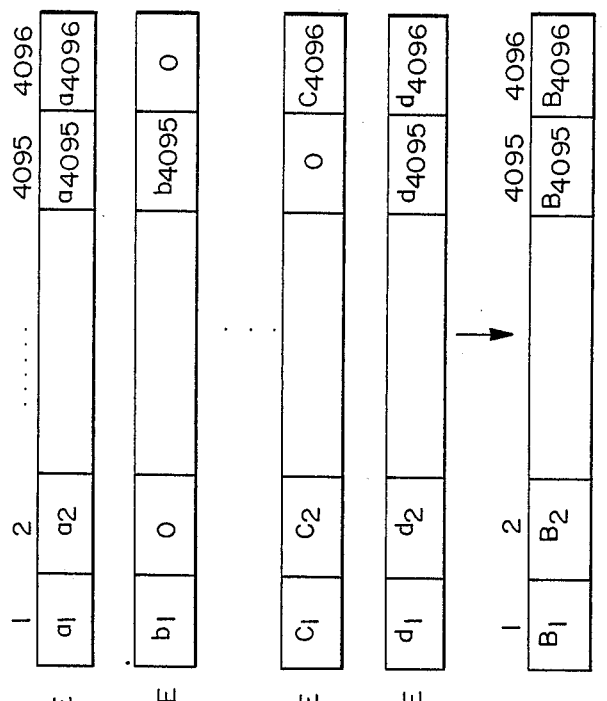
Figure 3:
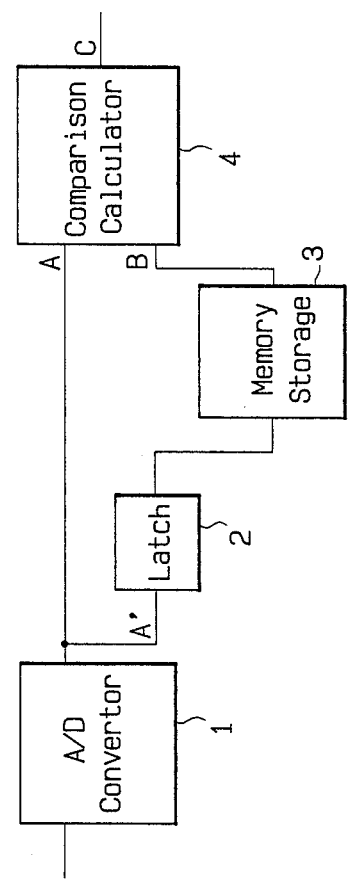
Figure 4:
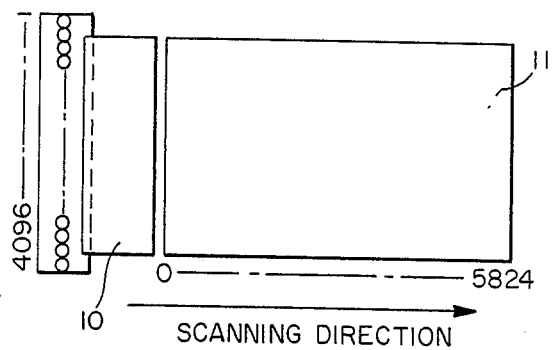
Figure 5:
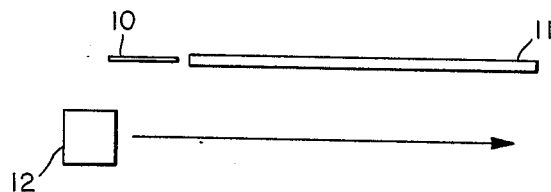

FIG. 1 is a block drawing indicating a circuit construction of a picture image signal compensation device of an embodiment according to this invention. The identical or corresponding parts to the parts shown in FIG. 3 are indicated with the same marks and numerals, but the explanation in detail is omitted here. In the drawing, (5) indicates a comparison analyzer to enable to eliminate the unusually low values and (6) an average value calculator constructed of addition and division calculators calculates an average value by processing the data.

Next, an explanation on working of the picture image signal compensation device of an embodiment of this invention as shown above in FIG. 1 will be made below. The picture image signal A' of the standard white level obtained from a whiteboard converted by A/D convertor is held by a latch 2 at a time of reference to the white level. In order to eliminate the unusually low values equivalent to the black data caused by dust and scratches, said picture image signal A' being compared with a comparing signal D by a comparison analyzer 5 in terms of largeness or smallness, and the contents of the latch 2 holding the picture image signal A' on condition of largeness being stored to the corresponding picture element in the memory storage 3.

Then the white data larger than the data of the comparative signal D over the plural lines are successively stored into each location corresponding to each of picture elements.

Figure 2:
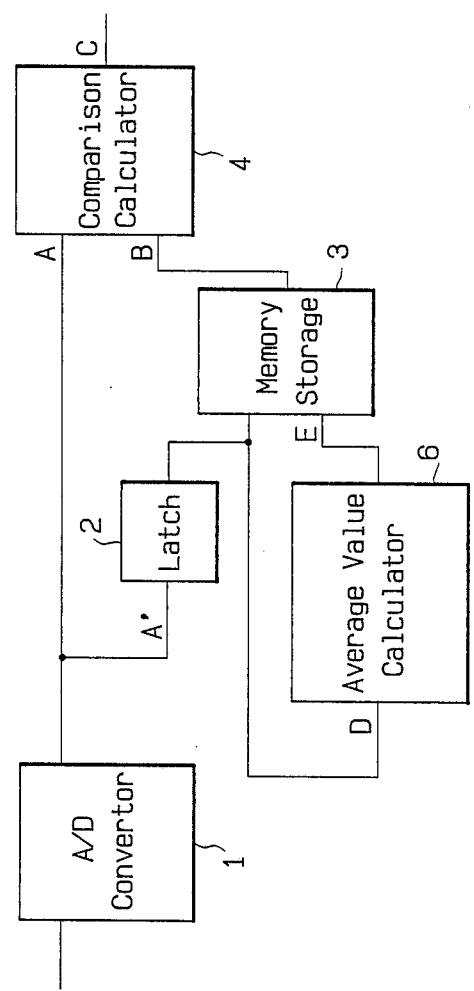

Reference activities of white level by the whiteboard 10 will be completed this way. During the period before a line image sensor 12 reads a manuscript 11, an average value datum of each of picture elements is obtained from the white data signals E of each of picture elements with the unusual values eliminated in the plural lines and added and divided successively by the average value calculator 6, and said average value data signal F being stored as a standard datum into the corresponding location of each of picture elements in the memory storage 3. Next, manuscript picture image signals A converted by A/D convertor 1 are compared proportionally by a comparison calculator 4, with the standard data signal B (white data signal) of the average value with the unusual values of the corresponding picture elements eliminated and stored in the memory, storage 3 and picture image compensated signals C having the manuscript picture element signals A compensated by the comparison calculator 4 are taken out. FIG. 2 is a block drawing indicating a circuit construction of a picture image signal compensation device of an embodiment of another invention of this invention application.

The identical or corresponding parts to the parts shown in FIG. 3 are indicated with the same marks and numerals but the explanation in details is omitted here.

In the drawing, (6) indicates an average value calculator constructed of addition and division calculators and calculates an average value by proceeding the data.

Next, an explanation on working of the picture image signal compensation of an embodiment of another invention of this invention application as shown above in FIG. 2 will be made below. The picture image signals A' of the standard white level obtained from a whiteboard 10 (not shown) converted by an A/D convertor 1 is held by a latch 2 at a time of reference at the white level and successively stored into the corresponding location of each of picture elements of a first line in the memory storage 3. Next, the picture image signals A' of a second line is stored successively into the corresponding location of each of picture elements of a second line in the memory storage 3, repeating above operation in plural lines, and in this manner the reference to the whiteboard 10 at the white level will be completed. Next, during the period before a line image sensor 12 reads a manuscript 11, an average value datum of each of picture elements is obtained from the white data (comparison signals) D of each picture element of each line by successive adding and dividing operations of an average value calculator 6, and the average value data signal E is stored into each location of the memory storage corresponding to each of picture elements as a standard datum. Next, manuscript picture image signals A converted by A/D convertor is compared proportionally by a comparison calculator 4, with the standard datum signal B of the average value at the white level of the corresponding picture element stored in the memory storage 3 and a picture image compensated signal C having the manuscript picture element signal A compensated by the comparison calculator 4 is taken out.

As explained above, this invention is a picture image signal compensation device in which data at the white level is decided at an average value eliminating the unusually low value of whiteboard in the scannings of plural times, or the datum at the white level are decided as an average value in the scannings of plural times of the whiteboard, and consequently even in a case that some dust or scratches on the whiteboard are on, precise and stable picture signals could be taken out, and consequently excellent effects such that low cost device which does not require too severe preciseness in maintaining, installing or manufacturing the whiteboard, are realized.

What is claimed is:

1. A picture image signal compensation device including:
    (a) an image sensing means,
    (b) an analog to digital converter having an input and output, with said input connected to said image sensing means for converting light signals into electrical signals,
    (c) a latch having an input and an output with said input being connected to the output of said analog to digital converter,
    (d) a comparison analyzer having an input, a reference signal input, and an output, with said input being connected to the output of said analog to digital converter,
    (e) a memory storage being connected to said comparison analyzer, and said latch,
    (f) an average value calculator connected to to said latch, and said memory storage; and
    (g) a comparison calculator having inputs and an output, with one of said inputs connected to the output of said analog to digital converter, and the other input connected to said memory storage and said average value calculator.

2. The device defined in claim 1, wherein said image sensing means is a line image sensor.

3. A picture image signal compensation device including:
    (a) an analog to digital converter having an input and an output,
    (b) an image sensing means connected to the input of said analog to digital converter,
    (c) a latch having an input and an output with said input connected to the output of said analog to digital converter,
    (d) a memory storage connected to said latch,
    (e) an average value calculator connected to said latch and said memory storage; and
    (f) a comparison calculator having two inputs and an output, with one of said inputs connected to the output of said analog to digital converter, and the other of said inputs connected to said memory storage.

4. The device defined in claim 3, wherein said image sensing means is a line image sensor.

5. A method for compensating for imperfections in whiteboard reference signals, said method including the steps of:
    (a) scanning said whiteboard with an image sensing means before manuscript is introduced by scanning each picture element with said image sensing means to obtain an electrical signal representing the whiteness of each picture element, (b) temporarily storing the value of each picture element, (c) comparing each value received from said image sensing means with a predetermined value representative of a satisfactory whiteboard surface, (d) eliminating all values received which are below said predetermined levels, (e) obtaining an average of the remaining values; and (f) storing the average values so obtained.

6. The method defined in claim 5, and including the additional steps of:

(a) scanning manuscript with said image sensing means over each of said picture elements and obtaining a standard data reference signal for each picture element, (b) comparing said standard data reference signal for each picture element with the average whiteboard signal; and (c) utilizing the results of said comparison for picture image signal compensation.

7. A picture image signal compensation device including:

(a) means to scan said whiteboard with an image sensing means before manuscript is introduced to obtain a value representing the whiteness of each picture element, (b) means to temporarily store the value of each picture element, (c) means to compare each value received from said image sensing means with a predetermined value representative of a satisfactory whiteboard surface, (d) means to eliminate all values received which are below said predetermined level, (e) means to obtain an average of the remaining signal values; and (f) means to store the average value so obtained.

8. The device defined in claim 7 and including:

(a) means to scan a manuscript with said image sensing device over each of said picture elements to obtain a standard data signal for each picture element, (b) means to compare the standard data signal for each picture element with the average whiteboard signal, and (c) means to utilize the results of the comparison for picture image signal compensation.

9. A picture image signal compensation device including:

(a) an analog to digital convertor having an input and an output, (b) an image sensing means connected to the input of said analog to digital convertor, (c) a comparison analyzer having an input, a reference signal input and an output, with said input connected to the output of said analog to digital converter, (d) a latch having an input and an output, with said input connected to the output of said analog to digital converter, (e) a memory storage connected to an address, (f) a NOR gate having inputs and an output, with said output connected to said memory storage, and one input each connected to said comparison calculator and said average value calculator, (g) an average value calculator having inputs and an output, with one of said inputs being connected to an address, and said output being connected to said NOR gate; and (h) a comparison calculator having inputs and an output, one of said inputs being connected to the output of said analog to digital converter, and the other of said inputs being connected to said latch, said memory storage and said average value calulator.

10. A picture image signal compensation device including:

(a) means to scan a white board with an image sensing means before manuscript is introduced to obtain a value representing the whiteness of each picture element;

(b) means to obtain an average of the values of the picture elements;

(c) means to store the average value so obtained;

(d) means to scan a manuscript with said image sensing means over each of said picture elements to obtain a standard data reference signal for each picture element;

(e) means to compare the standard data signal for each picture element with the average white board signal; and (f) means to utilize the results of said comparison for picture image signal compensation.

* * * * *